Sept. 11, 1934.     C. O. MARSHALL     1,973,685
COMPUTING WEIGHING SCALE
Filed June 10, 1932     5 Sheets-Sheet 1
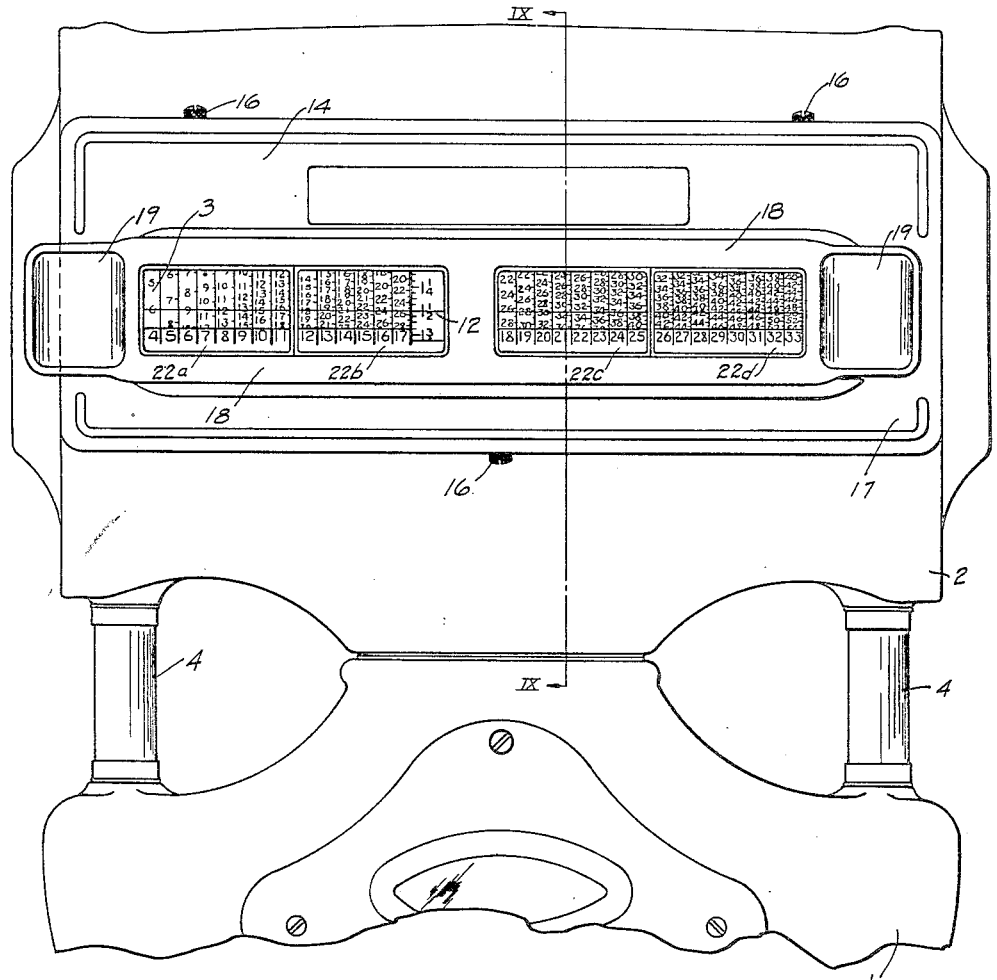
Fig. I
INVENTOR
Charles O. Marshall

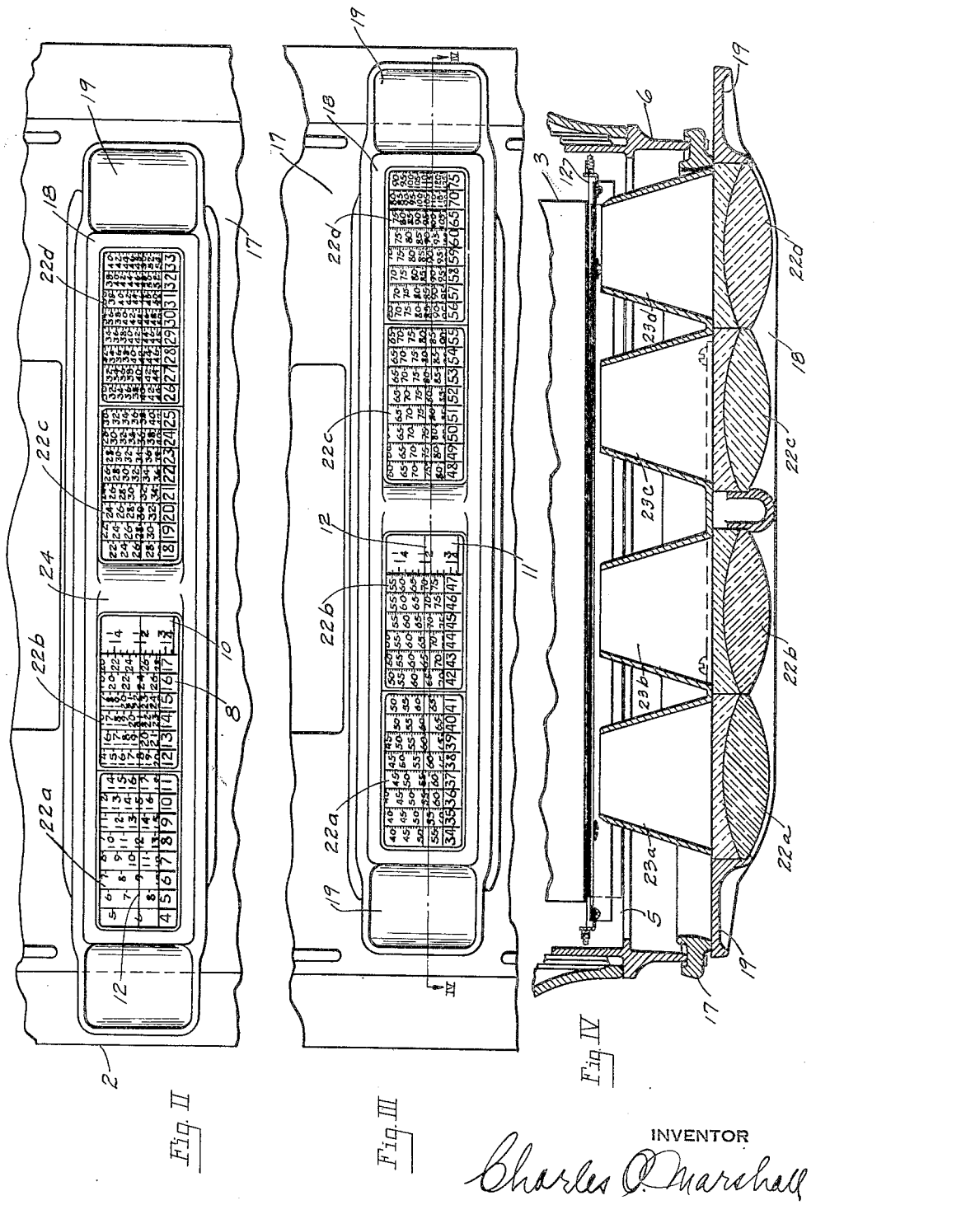

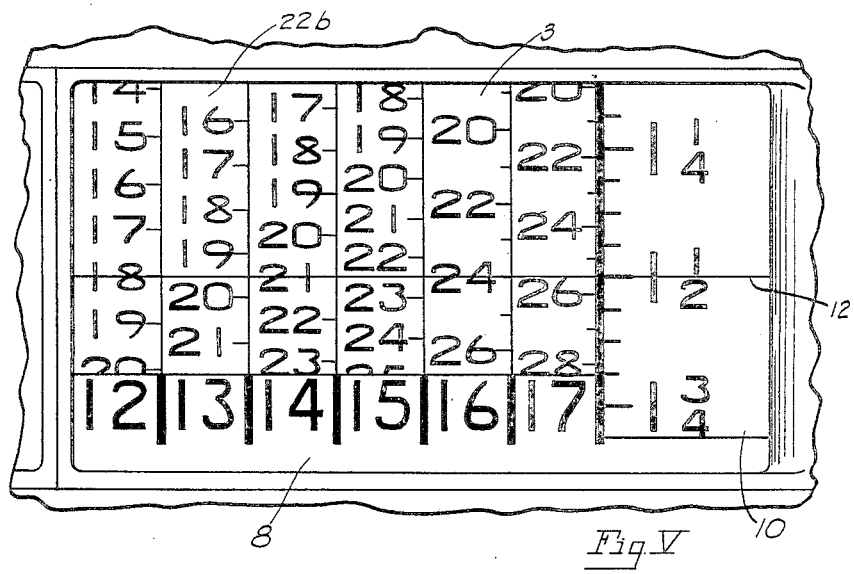
Fig. V
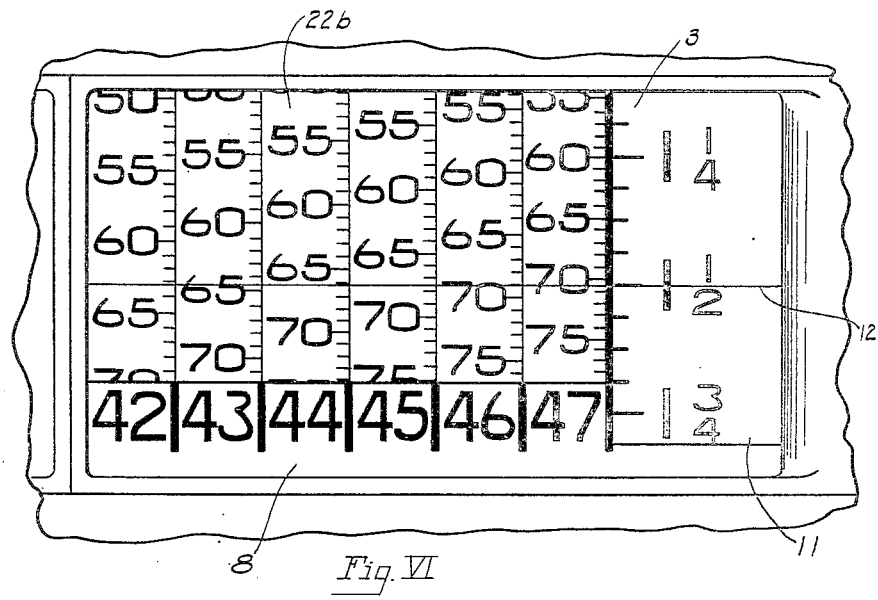
Fig. VI
INVENTOR
Charles O. Marshall

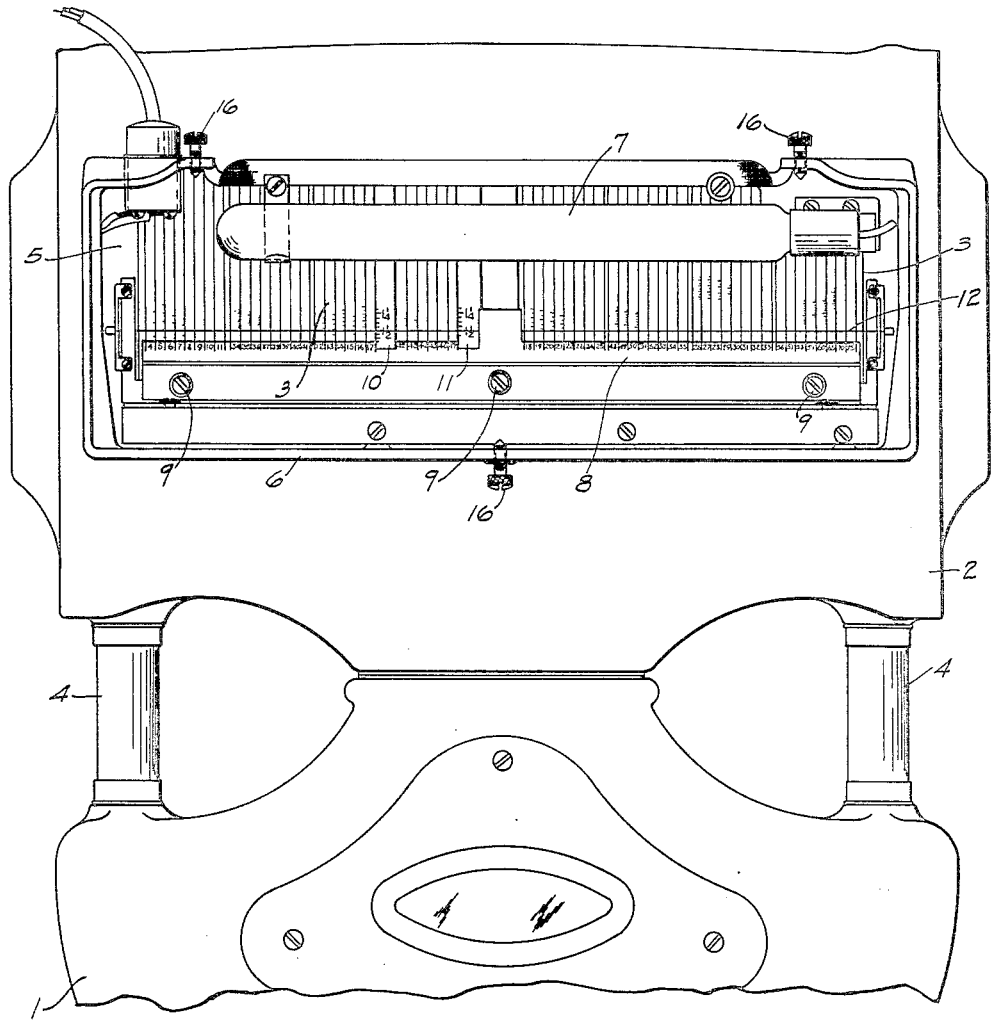
Fig. VII
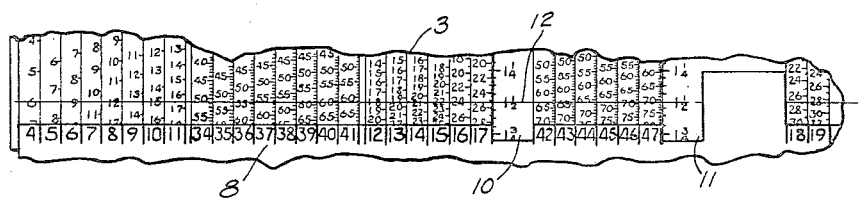
Fig. VIII
INVENTOR
Charles O. Marshall

Sept. 11, 1934.  C. O. MARSHALL  1,973,685
COMPUTING WEIGHING SCALE
Filed June 10, 1932    5 Sheets-Sheet 5
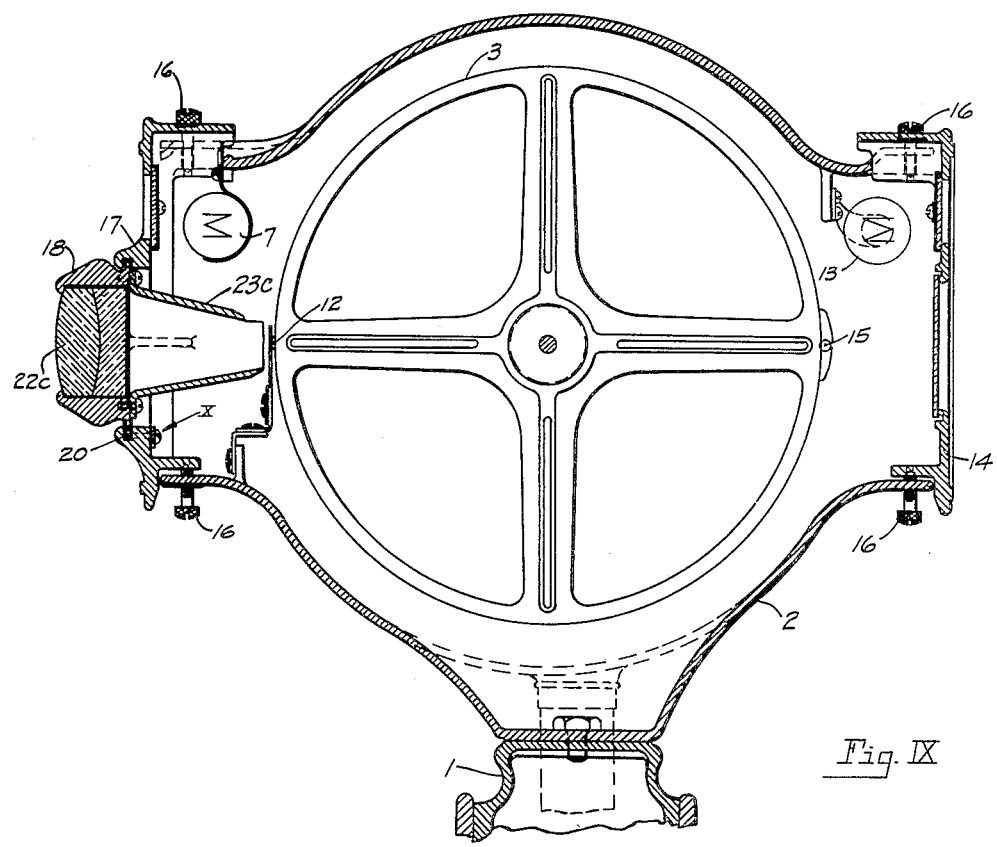
Fig. IX
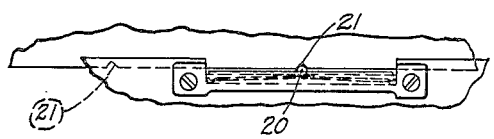
Fig. X
INVENTOR
Charles O. Marshall Patented Sept. 11, 1934

1,973,685

UNITED STATES PATENT OFFICE 1,973,685

COMPUTING WEIGHING SCALE

Charles O. Marshall, Toledo, Ohio, assignor to Toledo Scale Manufacturing Company, Toledo, Ohio, a corporation of New Jersey Application June 10, 1932, Serial No. 616,388

17 Claims. (Cl. 88—1)

This invention relates to computing weighing scales, and particularly to indicating devices therefor, and its principal object is the provision of means for increasing the number of prices at which computed values for various weights may be read.

Another object is the provision of means for extending the range of prices and computed values of scale indicating devices without increasing physical dimensions.

Still other objects are to improve the legibility of price and value characters of scale indicating devices and to minimize liability of error in reading the indication.

And still another object is the provision of means to facilitate the finding of prices and corresponding computed values.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of the upper part of a weighing scale embodying my invention.

Figure II is an enlarged fragmentary front elevation of the indicating part of the weighing scale in position to disclose price characters ranging consecutively from 4 cents per pound to 33 cents per pound, with corresponding computed value characters.

Figure III is a similarly enlarged fragmentary front elevational view of the indicator shifted to another position and disclosing, in apparently substantially the same area, price characters ranging consecutively from 34 cents per pound to 60 cents per pound, also 65, 70 and 75 cent prices, with corresponding computed value characters.

Figure IV is a horizontal sectional view taken substantially on the line IV—IV of Figure III.

Figure V is a further enlarged fragmentary front elevational view showing the portion of the indication viewed through one lens section and disclosing price characters from 12 cents per pound to 17 cents per pound, weight indicia and computed value characters.

Figure VI is a similarly enlarged front elevational view showing another portion of the indication viewed through the same lens section and disclosing price characters ranging from 42 cents per pound to 47 cents per pound, weight indicia and computed value characters.

Figure VII is a front elevational view similar to that of Figure I, with parts removed.

Figure VIII is an enlarged fragmentary front elevational view of a portion of a chart and price character bearing plate forming elements of my invention.

Figure IX is a sectional side elevational view taken substantially on the line IX—IX of Figure I; and Figure X is an enlarged fragmentary rear elevational view of the parts designated by the arrow X in Figure IX.

Referring to the drawings in detail, the upright housing 1, a portion of which is shown in Figures I, VII and IX and which may be of any desired form, supports a chart casing 2, within which a cylindrical chart 3 is supported upon bearings which permit it to revolve freely about its axis. The chart 3 is connected by means of a pinion and rack, not shown, or other suitable means which may extend downwardly through one or both of the tubular posts 4, to scale lever mechanism that may be of any desired construction; which, therefore, is not illustrated or described.

The chart casing 2 is provided with an elongated opening 5 in its forward side which is substantially surrounded by a flange 6. Mounted along the upper side of the opening 5 is an elongated incandescent lamp 7 which, when the scale is in use, brilliantly illuminates the forward side of the chart 3 as well as a stationary price range plate 8 which is mounted, by means of screws 9, along the lower side of the opening 5. The price range plate 8 is marked with alternate sets of low and high prices ranging from 4 to 11, 34 to 41, 12 to 17, 42 to 47, 18 to 25, 48 to 55, 26 to 33 and 56 to 60, and also the prices 65, 70 and 75. The sets of low prices thus form a consecutive numerical succession, while the sets of high prices form a succession in which also the prices are numerically arranged. The surface of the chart 3 is provided with a band of value graduations and value computations corresponding to, and in registration with, each of the prices on the price character bearing plate. The chart is also provided with two bands or annular series of weight indicia 10 and 11 (see Figures VII and VIII). Stretched in front of the chart 3 a short distance above the price character bearing plate is a reading line 12 which indicates the particular graduations and computations that correspond to the weights on the scale and prices at which values of commodities are computed.

The rear side of the chart is illuminated by a lamp 13 and a band of weight indications invisible on the merchant's side of the scale is visible to the customer through an opening in a rear frame 14 which is secured by means of screws to the rear side of the chart casing 2. A rear reading line 15 serves to indicate the proper weight indicia to the customer.

Removably secured to the flange 6 by means of screws 16 is a rectangular frame 17 having an elongated opening over which is slidably positioned a bezel 18. In order to facilitate the slidable movement of the bezel 18, the bezel is provided at each end with a tab or fingerpiece 19. The operator, thus, has only to push or pull a tab with either hand. The effort required to move the bezel is negligible, the bezel being mounted on bearing balls 20, one of which enters one of the notches 21 at each end of the movement of the bezel and thus serves to hold it against accidental displacement.

Mounted in the bezel 18 are four spherical lenses, 22a, 22b, 22c and 22d, of such magnifying power and at such a distance from the front of the chart 3 that characters on the chart viewed through the lenses are magnified two dimensions both vertically and horizontally. Secured to the rear side of the sliding bezel 18 is a set for frusto-pyramidal lens cells 23a, 23b, 23c and 23d, each lens cell being positioned directly back of a lens, as shown in Figure IV, and having an opening in its forward end corresponding substantially to the area of the lens and an opening in its rear end adjacent the front side of the chart of substantially one-fourth the area of the lens. Hence the portion of the chart viewed through each of the lenses and lens cells is one-half as high and one-half as wide as the face of the lens, but because both its height and its width are magnified two dimensions, the portion of the chart viewed through the lens appears to be substantially co-extensive in area with the lens, and the interior of each lens cell as seen through its lens appears as a rectangular passage, the walls of which appear not to converge but to extend parallel to each other rearwardly from each edge of the lens; thus the adjacent sides of each two lens cells appear to merge into one thin wall extending directly to the rear (see Figures I, II, III, V and VI).

When the slidable bezel 18 is in the position in which it is shown in Figures I and II, the rear opening of the lens cell 23a lies directly over that portion of the price character bearing plate 8 which bears the prices 4, 5, 6, 7, 8, 9, 10 and 11, and the corresponding portion of the chart 3; and the rear opening of the adjacent lens cell 23b lies directly over that portion of the price character bearing plate 8 which bears the prices 12, 13, 14, 15, 16 and 17, and the corresponding portion of the chart and also the portion of the chart bearing the series of weight indicia 10. The portion of the price plate and chart which lies between the prices 11 and 12 and their corresponding series of value graduations and computations is hidden behind the adjacent sides of the lens cells 23a and 23b, but since because of the optical effect explained above these adjacent sides appear to merge into a single thin wall, there is nothing to indicate to the observer that the portions of the price plate and chart viewed through adjacent lenses are not immediately adjacent each other. With the bezel 18 in the position in which it is shown in Figures I and II, the operator sees an apparently continuous series of prices ranging from 4 cents to 17 cents and a continuous series ranging from 18 cents to 33 cents, the two series being separated by the portion of the chart bearing the weight indicia and the bridge 24 covering a series of weight indicia, not shown, which is visible to the customer through an opening in the back of the casing 2. There is nothing in the appearance of the device to inform the operator or observer that he does not see the entire front of the chart with the exception of the part covered by the bridge 24 and occupied by the customer's indicia.

If now the bezel 18 with the lenses and lens cells carried thereby be shifted from the position in which it is shown in Figures I, II and V to the right a distance equal to one-half the width of one of the lenses into the position in which it is shown in Figures III and VI, a whole new succession of higher prices and corresponding computations materializes seemingly out of the apparently thin walls separating the lens cells. The prices 4 to 11, with their computations, vanish from behind the lens 22a and in their places appear the prices 34 to 41, with their computations. The prices 12 to 17, with their computations, shown behind the lens 22b in Figure V are transformed into the prices 42 to 47, with their computations, shown behind the lens in Figure VI. The mystifying effect of the materialization of the higher prices and their computations is valuable in attracting and holding attention and in strikingly demonstrating the double utility of the indicating device, which provides two apparently full size price ranges in the physical compass of one, thus making available in large legible figures all the prices and values in consecutive order, without omission, from 4 to 60, and also the prices 65, 70 and 75; whereas heretofore, even when much smaller figures were used, it has been necessary, for lack of room, to omit many of the more seldom used prices from charts of similar actual size.

Since the chart is seen apparently at the end of a rectangular passage the walls of which are parallel, the operator instinctively takes a position directly before the lens just as he instinctively looks through the center of a peep sighting on a rifle. For this reason, there is no probability of an error in reading caused by either horizontal or vertical parallax, and even if the operator persists in taking a position as far as possible to one side, or above, or below, it is impossible to see the indicated value from a position in which a price appears to correspond to the wrong computed value or appreciable error can occur in reading the comparative position of a graduation and the reading line.

Because of the grouping of a comparatively small number of price characters into a set behind each of the four lenses, the finding of a required price is greatly facilitated, the principle being the same as that employed in dividing the proverbial haystack into small wisps to facilitate the finding of the needle.

I have shown the lenses of such size that four of them are required for co-operation with a chart of the size illustrated. Obviously, a longer chart will require more or larger lenses. It is also obvious that more smaller lenses, or fewer larger lenses, can be employed with a chart of given length.

By using lenses of increased magnification the number of changes may be correspondingly increased. For example, if lenses magnifying three dimensions be used and the size of the opening in the ends of the lens cells that are next the chart be reduced correspondingly, the visible bands of computations will occupy only about one-third of the chart length instead of approximately one-half as in the embodiment illustrated in the drawings. Hence if lenses magnifying three dimensions be used, two invisible bands of computations may be located to the right of each band visible in the initial position of the bezel and the invisible bands may be brought successively into visibility by successive shifts to the right of the bezel with its lenses and lens cells.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a chart, said chart bearing characters occupying a part of its length, means for causing said characters apparently to occupy substantially the whole of the length of said chart, said chart bearing other characters occupying another part of its length, and means selectively to affect the first said means to cause such other characters apparently to occupy substantially the whole of the length of said chart the first mentioned characters being arranged in spaced relation along said chart, the other characters alternating with the first said characters.

2. In a device of the class described, in combination, a chart bearing spaced sets of characters occupying a part of its length, means for hiding the spaces between said sets and magnifying means for rendering the characters of said sets visible, said means being so constructed and positioned and the spaced sets of characters being so proportioned and related to said means as to cause said spaced sets of characters to appear unspaced and hence apparently to occupy substantially the whole of the length of said chart.

3. In a device of the class described, in combination, a chart, said chart bearing characters occupying a part of its length and other characters occupying another part of its length, and viewing means for magnifying or eclipsing selectively either the first said characters or the other said characters the parts being so constructed and arranged that the characters visible through said viewing device apparently occupy the entire length of said chart.

4. In a device of the class described, in combination, a chart bearing a plurality of spaced sets of characters occupying a part of its length, a plurality of other sets of characters interdisposed among the first said sets of characters, a magnifying lens constructed and disposed to magnify each of the first said sets of characters, and means for eclipsing the other said sets of characters, the size and arrangement of said characters and the construction, arrangement and proportions of said magnifying lenses and eclipsing means being such that the first said sets of characters are caused collectively apparently to occupy substantially the entire length of the chart.

5. In a device of the class described, in combination, a chart bearing a plurality of spaced sets of characters occupying a part of its length, a plurality of other sets of characters interdisposed among the first said sets of characters, a magnifying lens constructed and disposed to magnify each of the first said sets of characters, means for eclipsing the other said sets of characters, the size and arrangement of said characters and the construction arrangement and proportions of said magnifying lenses and eclipsing means being such that the first said sets of characters are caused collectively apparently to occupy the entire length of the chart, and means whereby said lenses and eclipsing means may be shifted to disclose previously eclipsed sets of characters and eclipse previously disclosed sets.

6. In a device of the class described, in combination, a member bearing spaced sets of price characters, the price characters of each set being numerically arranged, said member also bearing other sets of price characters interdisposed among the first said sets, the price characters of said other sets also being numerically arranged, and means for magnifying selectively or eclipsing alternatively either the first said sets of characters or said other sets of characters, the dimensions and arrangement of the characters and the structure and arrangement and proportions of the magnifying and eclipsing means being such that the magnified sets of characters appear unspaced and arranged in numerical order.

7. In a device of the class described, in combination, a member bearing spaced sets of price characters, the price characters of each set being numerically arranged, said member also bearing other sets of price characters interdisposed among the first said sets, the price characters of said other sets also being numerically arranged, a chart bearing value characters corresponding respectively to the price characters of each of said sets, and means for magnifying selectively or eclipsing alternatively either the first said sets of price characters, with their corresponding value characters, or said other sets of price characters, with their corresponding value characters, the relative dimensions of the sets of characters and the construction, arrangement and proportions of the magnifying and eclipsing means being such that the magnified sets of price and value characters appear unspaced and arranged in numerical order.

8. In a device of the class described, in combination, a member bearing a plurality of spaced sets of price characters, the characters of each set being numerically arranged, said member also bearing other sets of price characters interdisposed among the first said sets, the price characters of said other sets also being numerically arranged, a chart bearing value characters corresponding respectively to the price characters of each of said sets, a magnifying lens constructed and disposed to magnify each of the first said sets of characters, and a hollow lens cell lying between each said lens and said characters and having an opening adjacent said lens and an opening adjacent a set of said characters, the ratio of the dimensions of said openings being substantially equivalent to the magnifying power of said lens as applied to characters on said chart, the price characters of the first said sets, with their corresponding value characters, being visible through said lens cells and said lenses, the price characters, with their corresponding value characters, of said other sets being eclipsed by said lens cells and means whereby said other sets may be rendered visible.

9. In a device of the class described, in combination, a member bearing a plurality of spaced sets of price characters, the characters of each set being numerically arranged, said member also bearing other sets of price characters interdisposed among the first said sets, the price characters of said other sets also being numerically arranged, a chart bearing value characters corresponding respectively to the price characters of each of said sets, a magnifying lens constructed and disposed to magnify each of the first said sets of characters, a hollow lens cell lying between each said lens and said characters and having an opening adjacent said lens and an opening adjacent a set of said characters, the ratio of the dimensions of said openings being substantially equivalent to the magnifying power of said lens as applied to characters on said chart, the price characters of the first said sets, with their corresponding value characters, being visible through said lens cells and said lenses, the price characters, with their corresponding value characters, of said other sets being eclipsed by said lens cells, and means whereby said lenses and lens cells may be shifted to disclose previously eclipsed sets of characters and eclipse previously disclosed sets.

10. In a device of the class described, in combination, a member bearing a plurality of spaced sets of price characters, the characters of each set being numerically arranged, said member also bearing other sets of price characters interdisposed among the first said sets, the price characters of said other sets also being numerically arranged, a cylindrical chart bearing bands of value characters corresponding respectively to the price characters on each of said sets, a magnifying lens constructed and disposed to magnify each of the first said sets of characters to the extent of doubling their dimensions, a hollow frusto-pyramidal lens cell lying between each said lens and a set of said characters and having an opening adjacent said lens and an opening adjacent said characters, the ratio of the dimensions of said openings being substantially equivalent to the magnifying power of said lens, the price characters of the first said sets, with their corresponding bands of value characters, being visible through said lens cells and said lenses, the price characters, with their corresponding bands of value characters, of said other sets being eclipsed by said lens cells, and means whereby said lenses and lens cells may be shifted to disclose previously eclipsed sets of characters and eclipse previously disclosed sets.

11. In a device of the class described, in combination, a chart, a magnifying device, said magnifying device having a lens constructed and disposed to magnify characters on said chart and a hollow lens cell lying between said lens and said chart and having an opening adjacent said lens and adjacent said chart, the ratio of dimensions of said openings being substantially equivalent to the magnifying power of said lens as applied to characters on said chart, and means whereby said magnifying device may be shifted along said chart to render different characters visible therethrough.

12. In a device of the class described, in combination, a chart, said chart bearing characters occupying a part of its length, a viewing device including magnifying means, the parts being so arranged that when said characters are viewed with the aid of said magnifying means said characters apparently occupy substantially the whole of the length of said chart, said chart bearing other characters occupying another part of its length, means whereby said viewing device may be shifted selectively to cause such other characters when viewed with the aid thereof apparently to occupy substantially the whole of the length of said chart, means for concealing such other characters when the first said characters are viewed through said magnifying means and for concealing the first said characters when such other characters are viewed through said magnifying means, the first said characters being arranged in spaced relation along said chart, the other characters alternating with the first said characters.

13. In a device of the class described, in combination, a chart bearing spaced sets of characters occupying part of its length, said chart also bearing other spaced sets of characters interdisposed among the first said sets and alternating therewith, eclipsing and magnifying means for selectively rendering said sets of characters visible, said means being so constructed and positioned and the sets of characters being so proportioned and related to said means as selectively to cause either of said spaced sets of characters to appear unspaced and hence apparently to occupy substantially the whole of the length of said chart.

14. In a device of the class described, in combination, a chart, said chart bearing spaced sets of characters occupying a part of its length and other sets of characters interdisposed among the first said sets, means for magnifying one of said sets of characters and means for eclipsing the remaining sets of characters, the parts of said magnifying and eclipsing means being so constructed and arranged that the sets of characters viewed through said magnifying means apparently occupy the whole of the length of said chart.

15. In a device of the class described, in combination, a chart, said chart bearing spaced sets of characters occupying a part of its length and other sets of characters interdisposed among the first said sets, means for magnifying certain of said sets of characters, means for eclipsing the remaining sets of characters, and means whereby the magnifying means may be selectively applied to certain of said sets of characters and the remaining characters simultaneously eclipsed, the parts of said magnifying and eclipsing means being so constructed and arranged that the sets of characters viewed through said magnifying means apparently occupy the whole of the length of said chart.

16. In a device of the class described, in combination, a member bearing a succession of sets of optically similar price characters and a second succession of sets interdisposed among the first said sets, a chart bearing sets of value characters corresponding respectively with said price characters, means for selectively concealing each succession of sets of price and value characters, and magnifying means for bringing the other succession of sets of price and value characters selectively into view as an unspaced succession.

17. A scale having a weight controlled computing chart with spaced apart indicating fields having characters to be read at the same side of the scale, a plurality of contiguous lens elements, each in front of one of said fields and wider than said field to magnify the latter without distortion, and means for isolating the fields from each other to restrict each lens element to reading only its associated field comprising tapering walls diverging from the adjacent sides of a pair of contiguous lenses to the adjacent sides of the fields viewed through said lenses.

CHARLES O. MARSHALL.